(12) United States Patent
Croxford et al.

(10) Patent No.: US 11,500,204 B2
(45) Date of Patent: Nov. 15, 2022

(54) HEAD-MOUNTED DISPLAY

(71) Applicant: Arm Limited, Cambridge (GB)

(72) Inventors: Daren Croxford, Swaffham Prior (GB); Roberto Lopez Mendez, Cambridge (GB); Erik Persson, Lund (SE); Sean Tristram Leguay Ellis, Farnham (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/896,853

(22) Filed: Jun. 9, 2020

(65) Prior Publication Data

US 2021/0382306 A1 Dec. 9, 2021

(51) Int. Cl.
*G02B 27/01* (2006.01)

(52) U.S. Cl.
CPC ..... *G02B 27/0172* (2013.01); *G02B 27/0176* (2013.01); *G02B 2027/0178* (2013.01)

(58) Field of Classification Search
CPC ............... G02B 27/017; G02B 27/0172; G02B 27/0176; G02B 2027/0178
See application file for complete search history.

(56) References Cited

U.S. PATENT DOCUMENTS

| | | | | |
|---|---|---|---|---|
| 8,665,178 B1* | 3/2014 | Wang | ................ | G02B 27/0172 |
| | | | | 345/8 |
| 2015/0237336 A1* | 8/2015 | Sylvan | ................ | G02B 27/0093 |
| | | | | 348/54 |
| 2016/0018645 A1* | 1/2016 | Haddick | ................ | G06T 19/20 |
| | | | | 345/8 |
| 2016/0371886 A1* | 12/2016 | Thompson | .............. | G06F 3/013 |
| 2016/0378180 A1* | 12/2016 | Theytaz | ............. | G02B 26/0833 |
| | | | | 345/8 |
| 2018/0067314 A1* | 3/2018 | Nortrup | ............. | G02B 27/0093 |
| 2018/0088323 A1* | 3/2018 | Bao | ..................... | G02B 27/0093 |

OTHER PUBLICATIONS

Grayson, Chris, "Holographic Waveguides: What You Need To Know To Understand The Smartglasses Market" https://uploadvr.com/waveguides-smartglasses/ May 4, 2017.

* cited by examiner

*Primary Examiner* — Amare Mengistu
*Assistant Examiner* — Cory A Almeida
(74) *Attorney, Agent, or Firm* — EIP US LLP (57) ABSTRACT

A head-mounted display (HMD) comprising a first side for facing a user of the HMD, a second side opposite to the first side, and a reflective layer for at least partially reflecting incident light incident on the second side. At least one processor of the HMD is configured to obtain luminance data indicative of a luminance of the incident light and control a display device, based on the luminance data, to control a luminance of a portion of emitted light directed towards the user of the HMD during the display of the image. Further examples relate to an HMD with a display device configured to emit light of at least one predetermined wavelength range during display of an image by the display device, and a layer arranged to at least partially prevent transmission of the light of the at least one predetermined wavelength range outward from the HMD.

20 Claims, 3 Drawing Sheets

HEAD-MOUNTED DISPLAY

BACKGROUND OF THE INVENTION

Field of the Invention

The present invention relates to a head-mounted display (HMD), a processing system for an HMD and a method of controlling an HMD.

Description of the Related Technology

A large number of electronic devices are capable of displaying visual content to a user, such as image, text or video content. Such display devices range from the relatively large, such as televisions, to the relatively small and portable, such as smartphones and smart watches. Known devices for displaying visual content to a user include HMDs. HMDs may be used for various purposes, including augmented reality (AR), mixed reality (MR) and virtual reality (VR).

SUMMARY

According to a first aspect of the present disclosure, there is provided an HMD comprising a first side for facing a user of the HMD, a second side opposite to the first side, a reflective layer for at least partially reflecting incident light incident on the second side of the HMD, a display device configured to emit, during display of an image by the display device, a first portion of emitted light which is directed towards the user of the HMD and a second portion of emitted light which is directed outward from the second side of the HMD, and at least one processor configured to: obtain luminance data indicative of a luminance of the incident light, and control the display device, based on the luminance data, to control a luminance of the second portion of emitted light during the display of the image by the display device.

According to a second aspect of the present disclosure, there is provided head-mounted display (HMD) comprising: a first side for facing a user of the HMD; a second side opposite to the first side; a display device configured to emit light of at least one predetermined wavelength range during display of an image by the display device; and a layer arranged to at least partially prevent transmission of the light of the at least one predetermined wavelength range outward from the second side of the HMD.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
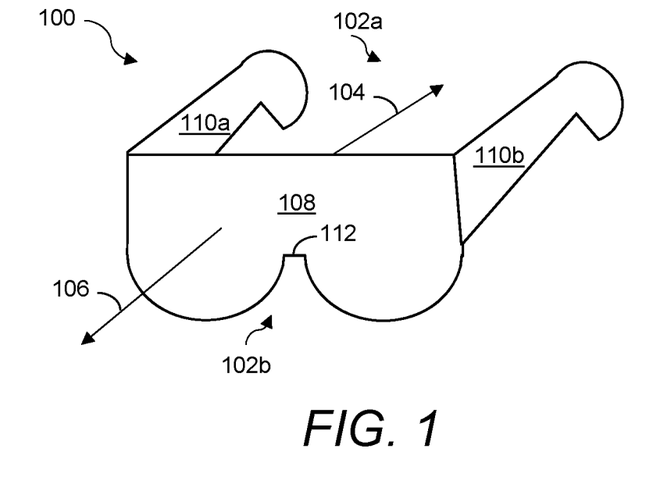
FIG. 1 is a schematic diagram of an HMD according to examples herein.

FIG. 1 is a schematic diagram of a head-mounted display (HMD) 100 according to examples herein. An HMD is for example a device that is wearable on a user's head for displaying an image to the user, such as an augmented reality (AR) image, a mixed reality (MR) image or a virtual reality (VR) image. A first side 102a of the HMD 100 is for facing a user of the HMD 100. The HMD 100 has a second side 102b opposite to the first side 102a. The first side 102a of the HMD 100 is therefore closer to the user than the second side 102b when the HMD is mounted on the user's head. The HMD 100 includes a display device to emit, during display of an image by the display device, a first portion 104 of emitted light which is directed towards the user of the HMD. In this way, the user can view the image. In this example, the display device also emits a second portion 106 of emitted light during display of the image, e.g. as a consequence of displaying the image to the user, due to leakage of light from the HMD 100. The second portion 106 of emitted light is directed outward from the second side 102b of the HMD 100. This is explained further with reference to FIG. 2.

Figure 2:
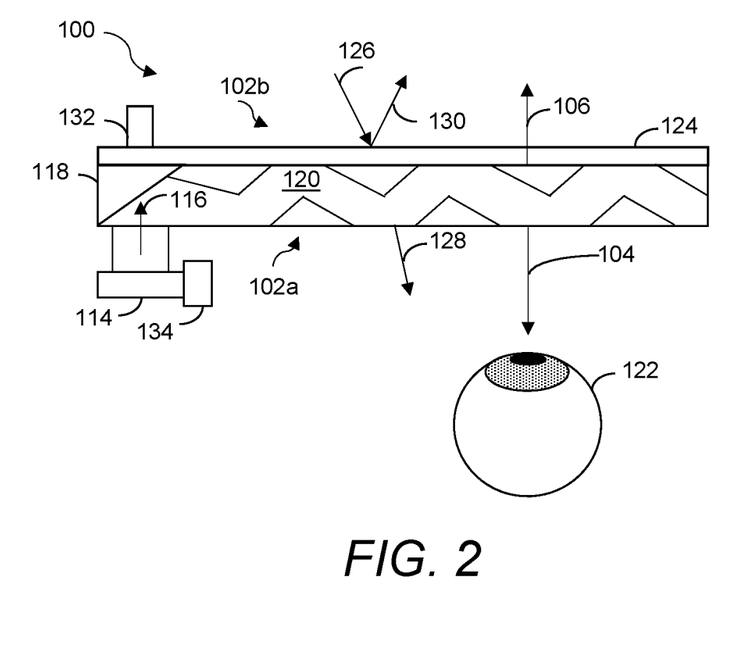
FIG. 2 is a schematic diagram showing features of the HMD of FIG. 1 in more detail.

The HMD 100 has a reflective layer for at least partially reflecting incident light incident on the second side 102b of the HMD 100, which is shown in FIG. 2. By reflecting the incident light, the reflective layer reduces the contribution of the second portion 106 of emitted light to light incident on an eye of an observer at the second side of the HMD 100. For example, if the luminance of the reflected light exceeds that of the luminance of the second portion 106 of emitted light, the observer may not be able to perceive the image being displayed by the display device, or may perceive it to a lesser extent. However, the ambient light level may decrease during display of the image, e.g. if the HMD is initially worn outside, in bright light, but the user subsequently moves indoors, to a dark room. If the ambient light level decreases, the luminance of the reflected light typically also decreases. If the luminance of the reflected light decreases to a certain point, the second portion 106 of emitted light may begin to make a noticeable contribution to the light incident on the eye of the observer. The second portion 106 of emitted light, and hence the image being displayed by the display device, may then become visible to the observer. In some cases, e.g. if the image contains private or otherwise sensitive information, visibility of the image to the observer may be undesirable.

To control the visibility of the image to an observer at the second side 102b of the HMD 100, e.g. such that a particular visibility (or lack of visibility) of the image is maintained despite changes in an ambient luminance level, the HMD 100 in this example includes at least one processor to control the display device, based on luminance data indicative of a luminance of the incident light incident on the second side 102b of the HMD 100, to control the luminance of the second portion 106 of emitted light. For example, the at least one processor may be configured to maintain the visibility of the image to the observer at the second side 102b of the HMD 100 by controlling the luminance of the second portion 106 of emitted light, e.g. to control the contribution of the second portion 106 of emitted light to the light incident on the observer's eye. For example, the luminance of the second portion 106 can be reduced in response to a reduction in the luminance of the incident light (e.g. if the HMD is moved from bright to dark conditions during display of the image), so that the image remains substantially invisible to the observer at the second side 102b of the HMD 100. It is to be appreciated that references herein to the visibility of an image do not necessarily imply that the image is visible: a visibility may be zero or substantially zero, i.e. so the image is invisible or substantially invisible.

The example HMD 100 of FIG. 1 includes a display portion 108 for displaying the image to the user. The display portion 108 in this case corresponds to the section of the HMD 100 that is used to project light towards the user during the display of the image, so that the user can view the image. The display portion 108 in the example of FIG. 1 is partially transparent so that at least a portion of light incident on the display portion 108 is transmitted through the display portion 108. In this way, the user can view an external environment through the display portion 108. An image displayed by the HMD 100 may appear as if it is superimposed on the external environment in this case. In other cases, though, the luminance of the image may be sufficient that the user is unable to perceive the external environment behind the image, e.g. if the image is displayed using all of the display portion 108 or a region of the display portion 108 corresponding to a field of view of the user. A boundary of the display portion 108 for example corresponds to a boundary of a frame or other mounting apparatus for mounting the display portion 108. In these cases, the display portion 108 may be taken to correspond to a partially transparent screen region of the HMD 100, which is bounded by a frame (which may be opaque or at least partially opaque to incident light, although need not be).

The display portion 108 includes the reflective layer, which in this case is partially reflective for incident light, which is incident on the second side 102b of the HMD 100. However, despite the inclusion of the reflective layer, the display portion 108 is nevertheless partially transparent to the incident light. A portion of the incident light is reflected by the reflective layer, so as to disguise the appearance of the image to the observer at the second side 102b of the HMD 100. A different portion of the incident light is transmitted through the display portion 108, so that the external environment is visible to the user of the HMD 100 in this example. It is to be appreciated that transmission or reflection of a portion of light as described herein for example may refer to transmission or reflection of a subset of wavelengths of a range of wavelengths or to transmission or reflection of light (e.g. across the spectrum of wavelengths of visible light) but with a coefficient of transmission or reflection that is less than 1. In examples herein, light is considered to encompass visible light (e.g. with a wavelength from around 400 nanometers to around 700 nanometers), but may also include light outside the visible spectrum, such as infrared and/or ultraviolet light.

In FIG. 1, the display portion 108 is disposed between a first side portion 110a and a second side portion 110b of the HMD 100. In this case, the HMD 100 is in the form of glasses, and the first and second side portions 110a, 110b correspond to arms of the glasses (sometimes referred to as temples), which are stems that extend from each side of the display portion 108. When the HMD 100 is mounted on the user's face, e.g. with a bridge portion 112 of the display portion 108 resting on the user's nose, the first and second side portions 110a, 110b extend along opposite sides of the user's face, and hook or otherwise rest over the user's ears to secure the HMD 100 in place on the user's head. The first and second side portions 110a, 110b each have first and second sides, which form part of the first and second sides 102a, 102b of the HMD 100 respectively. In other words, the first sides of the first and second side portions 110a, 110b are arranged to face the user of the HMD 100, with the HMD 100 in use by the user. The second sides of the first and second side portions 110a, 110b are opposite to the first sides, and face an external environment with the HMD 100 in use by the user.

At least one of the first or second side portions 110a, 110b may be configured to at least partly prevent transmission of light therethrough, e.g. from the first side 102a of the HMD 100 to the second side 102b of the HMD 100 or vice versa. In the example HMD 100 of FIG. 1, the first and second side portions 110a, 110b are both configured to at least partly prevent transmission of light therethrough. By at least partly preventing transmission of light through at least one of the first and second side portions 110a, 110b, the privacy of the HMD 100 can be improved, e.g. by reducing visibility of the user to an observer external to the HMD 100 and/or by reducing leakage of light associated with display of the image by the display device of the HMD 100 to the second side 102b of the HMD 100.

To at least partly prevent transmission of light through the first and/or second side portions 110a, 110b, the first and/or second side portions 110a, 110b may include an absorbing layer, which is arranged to absorb at least a portion of incident light. In examples, the absorbing layer is a black or otherwise opaque layer. Such an absorbing layer may be arranged to overlap a region of the first or second side 102a, 102b of the HMD 100 associated with the first and/or second side portions 110a, 110b. In one case, a surface of the absorbing layer corresponds to a surface of the second side 102b of the first and/or second side portions 110a, 110b of the HMD 100, although in other cases, there may be at least one additional layer between the absorbing layer and the surface of the second side 102b.

The first and/or second side portions 110a, 110b may be detachable from the display portion 108 of the HMD 100. This provides flexibility for the user. The user can attach the first and/or second side portions 110a, 110b if greater privacy is desired or in a relatively bright environment, to increase the visibility of the image. The user can then detach the first and/or second side portions 110a, 110b to view less sensitive content or to view content in a dark environment. In these examples, the HMD 100 may include a frame or other mounting component to maintain the HMD 100 in place if the first and/or second side portions 110a, 110b are removed. For example, the first and/or second side portions 110a, 110b may clip or otherwise attach into a frame, which remains in place after the detachment of the first and/or second side portions 110a, 110b.

In other cases, the first side portion 110a includes a first polarizing filter and/or the second side portion 110b includes a second polarizing filter. In such cases, the at least one processor of the HMD 100 is configured to control a polarization of the first and/or second polarizing filter to control transmission of light through the first and/or second side portion 110a, 110b. The first and/or second polarizing filters can be controlled to selectively filter light incident on the HMD 100 (e.g. ambient light) or light incident on the first and/or second portions 110a, 110b from the first side 102a of the HMD 100.

It is to be appreciated that light emitted by the display device may be selectively filtered for various reasons. The polarization of the first and/or second polarizing filters can be controlled based on image data representative of the image, e.g. based on a content of the image. In one case, the light is filtered where it is desired to display a dark image to the user of the HMD 100, with the dark image superimposed on an environment which is relatively bright. By controlling the first and/or second polarizing filters to selectively filter light to reduce the amount of light transferred across the HMD 100, the external environment appears darker to the user, so that detail in the dark image is more clearly visible to the user. In other cases, the polarization of the first and/or second polarizing filters is controlled, based on a content of the image, to reduce transmission of light for an image (or at least a portion of an image) with private or otherwise sensitive content.

In other cases, the polarization of the first and/or second polarizing filters is controlled based on environmental data (e.g. the luminance data) representative of at least one feature of the environment in which the HMD 100 is being used. For example, the polarization of the first and/or second polarizing filters can be controlled to reduce transmission of light in response to an increase in the luminance of ambient light. This can maintain the visibility of the image to the user of the HMD 100, which otherwise may be reduced if a high luminance of light is transmitted through the HMD 100, e.g. through the first and/or second side portions 110*a*, 110*b*. In yet further cases, the polarization of the first and/or second polarizing filters is controlled based on image data and environmental data.

FIG. 2 is a schematic diagram showing features of the HMD 100 of FIG. 1 in more detail. It is to be appreciated that FIG. 2 is not to scale: the size of certain elements has been exaggerated for ease of illustration. As explained with reference to FIG. 1, the HMD 100 includes a display device 114 for displaying an image. Light 116 emanating from the display device 114 during the display of the image is incident on a prism 118 which refracts the light 116 to direct the light 116 into a waveguide 120. The waveguide 120 guides the light towards an eye 122 of a user so that the user can view the image displayed on the display device 114. Although not shown in FIG. 2 (which illustrates part of the HMD 100 of FIG. 1), it is to be appreciated that the waveguide 120 in this case also guides the light towards the other eye of the user. Various different waveguides may be used as the waveguide 120 of FIG. 2. In some cases, the waveguide is a surface relief waveguide, which includes a plurality of micro-ridges. Light entering the waveguide is incident on a first set of micro-ridges, undergoes internal reflection and is guided along a length of the waveguide. A second set of micro-ridges reflect the light out of the waveguide. In other cases, the waveguide is a holographic waveguide, which includes a plurality of holographic reflective optical elements. A first set of holographic elements reflects incident light and guides the light along the waveguide until the light is incident on a second set of holographic elements, which reflect the light out of the waveguide. In either a surface relief or holographic waveguide, as the light is guided along the length of the waveguide, the light typically undergoes at least one internal reflection within the waveguide, which generally includes a reflective internal surface.

The display device 114 of the HMD 100 is configured to emit a first portion of emitted light 104 which is directed towards the user of the HMD 100 (in this case, towards the user's eye 122), and a second portion of emitted light 106 which is directed outward from the second side 102*b* of the HMD 100. In this case, the first and second portions of emitted light 104, 106 are directed by the waveguide 120, but this is merely an example.

The first portion of emitted light 104 is incident on the user's eye 122 so that the user can view the image. In this example, the second portion of emitted light 106 is not intended for displaying the image to an observer at the second side 102*b* of the HMD 100, but instead is a consequence of displaying the image to the user at the first side 102*a* of the HMD 100, e.g. due to imperfect reflection of light at an interface between the waveguide 120 and an ambient environment. When light is incident on this interface, a portion of the light is reflected back into the waveguide 120 and another portion is transmitted into the ambient environment. If this occurs at the interface between the waveguide 120 and the ambient environment at the second side 102*b* of the HMD 100, the transmitted portion of light (referred to herein as the second portion of emitted light 106) will propagate into the ambient environment on the second side 120*b* of the HMD 100. The second portion of emitted light 106 will be visible to an observer located on the second side 120*b* of the HMD 100 provided the second portion of emitted light 106 is within the observer's field of view and is of sufficient intensity to be perceivable by the visual system of the observer. In this way, the observer on the second side 120*b* of the HMD 100 may be able to at least partly view an image intended to be visible to the user on the first side 120*a* of the HMD 100. For example, the observer may be able to perceive a color of the image displayed on the first side 120*a* of the HMD 100 or may be able to discern a content of at least part of the image displayed on the first side 120*a* of the HMD 100.

In this example, the HMD 100 also includes a reflective layer 124 for at least partially reflecting incident light 126 incident on the second side 102*b* of the HMD 100. By including the reflective layer 124, the HMD 100 is mirrored on one side (the second side 102*b*). A first portion 128 of the incident light 126 is transmitted through the HMD 100, towards the first side 102*a* of the HMD 100, and a second portion of the incident light 126 is reflected outward from the second side 102*b* of the HMD 100. The second portion of the incident light 126 may be referred to herein as reflected light 130. In this example, the first portion 128 of the incident light 126 is incident on the user's eye 122. This allows the user to perceive the ambient environment. The reflected light 130 propagates into the ambient environment at the second side 102*b* of the HMD 100, and may impinge upon the eye of an observer located in the ambient environment. It is to be appreciated that the direction of travel of the incident light 126, the first portion 128 of the incident light 128 and the reflected light 130 as shown in FIG. 2 are merely examples intended to illustrate the general principles behind operation of the HMD 100.

If the luminance of the reflected light 130 is sufficiently large relative to a luminance of the second portion 106 of emitted light, the observer at the second side 102*b* of the HMD 100 is unable to perceive the image corresponding to the second portion 106 of emitted light. The image displayed by the display device 114 is hence invisible or substantially invisible to the observer, e.g. so that the observer is unable to distinguish detail in the image.

In examples herein, at least one processor of the HMD 100 controls the display device 114 based on luminance data indicative of a luminance of the incident light 126. As explained further below with reference to FIGS. 3*a* and 3*b*, the display device 114 may be controlled in its entirety or on a region-by-region basis, based on the luminance data. In some cases, the display device 114 is controlled based on the luminance data to reduce a visibility of the image to the observer. The display device 114 is controlled to control the luminance of the second portion 106 of emitted light during display of the image, for example so that the luminance of the second portion 106 of emitted light relative to the luminance of the reflected light 130 is such that a particular visibility (or invisibility) of the image to the observer is achieved. For example, the luminance of the second portion 106 of emitted light can be controlled so that the image is invisible or substantially invisible to the observer.

The luminance data is indicative of the luminance of the incident light 126, but may not directly represent the luminance of the incident light 126. Instead, the luminance data may depend on the luminance of the incident light 126, e.g. such that changes in the luminance of the luminance of the incident light 126 correspond with changes in the luminance data. In the example of FIG. 2, the luminance data represents a luminance of ambient light at the second side 102b of the HMD 100. It is typically more straightforward to detect the luminance of ambient light rather than detecting the component of the ambient light that corresponds to the incident light 126. This is because the ambient light generally includes contributions from a multitude of sources, including the incident light 126.

In FIG. 2, the HMD 100 includes a photosensor 132 to detect the luminance of ambient light. A photosensor typically includes an array of sensor pixels for detecting light. A typical sensor pixel includes a photosensitive element such as a photodiode that can convert incident light into electronic signals or data. The sensor pixel may for example be a charge-coupled device (CCD) or a complementary metal-oxide-semiconductor (CMOS). In this way, the photosensor 132 can detect the luminance of ambient light, which is for example the light within the environment. Luminance is a photometric measure of the luminous intensity of light traversing a unit area, and is related to the brightness of the environment (whereas brightness is the subjective perception of the luminance to an observer).

In other examples, the luminance data may be obtained in a different manner. In one example, an HMD which is otherwise similar to the HMD 100 of FIGS. 1 and 2 may include a camera instead of or in addition to the photosensor 132. A camera may be used to obtain observation data representative of an observation of an environment at the second side of the HMD. Such an observation is for example an image of the environment. The observation data can be processed by the at least one processor of the HMD to obtain the luminance data. In one example, the observation data represents pixel values indicative of a luminance of respective portions of the environment. The pixel values can be processed to obtain the luminance data. For example, the luminance data may represent an average of the pixel values or an average of the pixel values for a portion of the observation. Using a camera of the HMD 100 allows the luminance data to be obtained efficiently, using existing components of the HMD 100 in some cases. For example, the HMD 100 may include a camera to provide various other functionality. An image obtained by the camera, representing an observation of the environment, can be utilized to obtain the luminance data and to provide the other functionality. This is described further with reference to the example of FIG. 4.

In FIG. 2, the luminance data represents the luminance of the ambient light. In this example, the at least one processor of the HMD 100 is configured to control the luminance of the second portion of emitted light 106 so that the luminance of the ambient light is greater than a luminance of light at the first side 102a of the HMD 100. By controlling the luminance in this way, the light at the second side 102b of the HMD 100 is for example dominated by the reflected light 130 rather than the second portion of emitted light 106, reducing the visibility of the image to the observer at the second side 102b of the HMD 100. For example, even if the image displayed at the first side 102a of the HMD 100 is relatively bright (leading to relatively high luminance of the second portion of emitted light 106), the image may nevertheless remain invisible to the observer at the second side 102b of the HMD 100 if the ambient light is sufficiently bright. However, if the luminance of the ambient light decreases, the image may start to become visible at the second side 102b. If the luminance of the second portion of emitted light 106 is also reduced in such a situation, though, such that the that the luminance of the ambient light is greater than a luminance of light at the first side 102a of the HMD 100, invisibility of the image at the second side 102b may be maintained. The example HMD 100 of FIG. 2 operates in this manner. If it is determined, based on the luminance data, that the luminance of the incident light has decreased (in this case, if the luminance of the ambient light has decreased), the display device 114 is controlled to decrease the luminance of the second portion of emitted light 106. In examples, the HMD 100 may repeatedly determine whether to adjust the luminance of the second portion of emitted light 106, based on the luminance data, which is typically time-varying. In other words, there may be a feedback loop, with the HMD 100 adjusting the luminance of the second portion of emitted light 106 based on the luminance data, receiving additional luminance data captured after the luminance of the second portion of emitted light 106 has been adjusted, and then subsequently adjusting the luminance of the second portion of emitted light 106 further.

The luminance of the second portion of emitted light 106 can be controlled in various different ways. For example, the second portion of emitted light 106 can be controlled by controlling the luminance of at least part of the image displayed by the display device 114. In general, reducing the luminance of at least part of the image reduces both the first portion of emitted light 104 and the second portion of emitted light 106. Controlling the image luminance in this way may be more straightforward than controlling the first or second portions of emitted light 104, 106 separately, and can be used to control the visibility (or lack thereof) of the image to the observer at the second side 102b without unduly affecting the display of the image to the user of the HMD 100.

The luminance of the second portion of emitted light 106 can be controlled by controlling a brightness of a backlight, e.g. if the display device 114 is a transmissive or transflective display device including a backlight, such as a liquid crystal display (LCD) device, a light emitting diode (LED) device, a quantum LED device, an organic light-emitting diode (OLED) device or a micro light emitting diode (micro-LED) device. In a typical transmissive display device, the transmissivity of each of the pixels is controllable to control the amount of light passing through each pixel, and hence the display effect of the pixel. Typically, pixels can be switched between a dark or black display effect, in which very little or no light can pass through, and a light or white display effect, in which most or all light can pass through. Backlights come in various forms, including globally-adjusted backlights, in which the luminance of the backlight is adjusted equally across the entire display device, one dimensional locally-adjusted backlights in which the luminance of the backlight may be adjusted differently along strip-like regions arranged side by side along one dimension of the display device, and two dimensional locally-adjusted backlights in which the luminance of the backlight may be adjusted differently in square or rectangular regions arranged in a two dimensional array across the display device. The backlight in these examples illuminates the pixels and contributes to a display luminance of the display device, and hence to the luminance of the second portion of emitted light 106 that emanates from the second side 102*b* of the HMD 100. As explained above, luminance is typically understood as referring to the luminous intensity per unit area of light travelling in a given direction, for example passing through a particular solid angle. Subjectively, the luminance may be considered to correspond to brightness, which is the visual perception of the luminance. For example, a higher luminance will generally be experienced by a viewer as a brighter display. The luminance of the display device 114, and hence the luminance of the second portion of emitted light 106, typically depends on the intensity of the backlight and the transmittance of the pixels of the display device 114 in examples with a backlight. Thus, the luminance of the second portion of emitted 106 in these examples can be controlled by controlling the intensity of the backlight.

In other cases, the luminance of the second portion of emitted light 106 can instead or in addition be controlled by controlling the luminance or intensity of respective pixels of an image, e.g. for a display device 114 without a backlight, such as a display device in which pixels or picture elements of the display device generate light, e.g. an organic light emitting diode (OLED) display device or a plasma display device. In one example, the at least one processor of the HMD 100 processes first image data representative of a first version of the image to adjust luminance values associated with respective pixels of the first version of the image, based on the luminance data. In this way, second image data representative of a second version of the image is generated. The display device 114 can then be controlled to display the second version of the image represented by the second image data.

For example, the luminance values of each pixel of the image (which may be referred to herein as intensity values), may be stored with a greyscale or brightness level of, for example, from 0 to 255 per color band for 8-bit data. A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. The first image data may also include color data relating to the color of the image represented by the first image data. For example, when the image is a color image, a pixel value of an intensity or brightness or each pixel may be stored separately for each color channel. If a pixel is represented by, for example, three primary colors such as in the RGB (red, green, blue) or YUV color spaces (where Y represents the luma of the color, U represents the difference between the blue component of the color and the luma and V represents the difference between the red component of the color and the luma), the visual appearance of each pixel may be represented by three intensity values, one for each primary color, for example with a bit precision of 8 bits per color channel. In examples in which the first image data is processed to adjust the luminance values associated with respective pixels of the first version of the image, the luminance values of the pixels may be scaled up or down, e.g. so that each of the pixels corresponds to a brightness level which differs by n brightness levels from an original brightness level (within an available range of brightness levels). Such an approach may be used to apply a global adjustment to the luminance values of the pixels, and may be combined with other adjustments (e.g. tone mapping) to maintain the image quality. In other cases, a suitable function may be applied to the luminance values of the pixels, e.g. to adjust the luminance values in a spatially-variant manner as discussed further below with reference to FIG. 3*b*. Adjustment of the luminance values in this way may be performed in various stages of a display pipeline for generating the image for display by the display device 114. For example, the luminance values may be adjusted during rendering of the image, e.g. by a graphics processing unit (GPU) of the HMD 100, or the luminance values may be adjusted at a later stage in the display pipeline, e.g. by the GPU or by a display processor.

In other cases, the visibility (or lack thereof) of the image to the observer at second side 102*b* can also or instead be controlled by controlling the luminance of the second portion of emitted light 106 relative to the luminance of the first portion of emitted light 104, e.g. such that the luminance of the second portion of emitted light 106 is less than the luminance of the first portion of emitted light 104. For example, the at least one processor of the HMD 100 may be configured to control a reflectivity of the reflective layer 124 to control the luminance of the second portion of emitted light 106, e.g. to reduce the luminance of the second portion of emitted light 106 relative to the luminance of the first portion of emitted light 104. For example, the reflective layer 124 may comprise a material with a reflectivity which is changeable in response to an external stimulus such as an electric or magnetic field. Such a reflective layer can be electrically switched by the at least one processor, e.g. using suitable circuitry to connect the reflective layer to the at least one processor.

In other examples, the reflectivity of the reflective layer 124 may remain constant over time. The reflective layer 124 in FIG. 2 is a metal layer, such as an aluminum layer. A thickness of the reflective layer 124 may be relatively small compared to a thickness of the display portion 108 of the HMD 100, so as to allow light from the external environment to be partially transmitted therethrough. The reflective layer may have a half-silvered surface, in which reflective particles coated an underlying layer relatively sparsely, with approximately half the number of reflective particles as would be needed to prevent light from being transmitted through the reflective layer 124. The reflective layer 124 of FIG. 2 is disposed as an outer layer of the HMD 100, closest to the second side 102*b*, to partially reflect the incident light 126 and prevent a portion of the incident light 126 from impinging on other optical components of the HMD 100, such as the waveguide 120. Hence, in this example, the waveguide 120 is disposed between the first side 102*a* of the HMD 100 and the reflective layer 124. This is merely an example arrangement, though, and in other HMDs that are arranged to perform the methods herein, the components may be arranged differently.

In the example of FIG. 2, the at least one processor of the HMD 100 is configured to obtain further luminance data indicative of the luminance of light at the first side 102*a* of the HMD 100, and use the further luminance data to further control the luminance of the second portion of emitted light 106. This approach can improve the control of the visibility of the image (or lack thereof), e.g. by allowing the luminance of the image displayed by the display device 114 to be controlled so as to achieve a particular luminance at the second side 102b relative to the first side 102a of the HMD 100. In other cases, though, such further luminance data need not be obtained.

As explained with reference to the luminance data, the further luminance data may represent the luminance of ambient light at the first side 102a of the HMD 100 or may merely depend on or be otherwise indicative of the luminance of the ambient light. The HMD 100 of FIG. 2 includes a further photosensor 134 configured to detect the luminance of the ambient light at the first side 102a, and thereby obtain the further luminance data. The further photosensor 134 may be a dedicated photosensor for use in obtaining the luminance data, or may additionally be used for another purpose. For example, the further photosensor 134 may form part of an eye-tracking sensor for obtaining gaze data representative of a gaze direction of a user, e.g. a direction in which the user's eye is looking or is focusing on. In such cases, the further photosensor 134 may be operable to capture light in the infrared spectrum for performing gaze detection and to capture light in the visible spectrum for obtaining the further luminance data. In such cases, the further photosensor 134 may include a controllable infrared filter, which is controllable, e.g. by the at least one processor, to either allow or prevent transmission of infrared light, for the infrared light to impinge on the further photosensor 134. In this way, the further photosensor 134 can be switched from obtaining gaze data (using infrared light) to obtaining further luminance data (using visible light).

In other cases, though, the further luminance data may be obtained by a different component. For example, the further luminance data may be obtained based on image data representing the image to be displayed, e.g. to determine the brightness of the image as displayed to the user. In this way, the luminance of the first portion of emitted light 104 can be calculated. The luminance of the first portion of emitted light 104 is generally indicative of the luminance of ambient light at the first side 102a of the HMD 100 (as changes in the luminance of the first portion of emitted light 104 tend to lead to corresponding changes to the luminance of the ambient light at the first side 102a). Hence, the luminance data may represent a calculated or otherwise estimated luminance of the first portion of emitted light 104. For example, pixel values representative of a luminance of respective pixels of the image displayed by the display device can be averaged, to determine an average luminance, which may be taken as indicative of the luminance of ambient light at the first side 102a. Determination of the further luminance in this way may involve calculating an attenuation of the light emitted by the display device 114 during transmission through optical components of the HMD 100 to reach the user (including the waveguide 120), to more accurately determine the luminance of the first portion of emitted light 104. In examples in which the image data represents the image using RGB values, the image data may be converted to a different format (e.g. YUV) before determining the luminance, to facilitate the accurate determination of the luminance. It is to be appreciated that the photosensor 132 and the further photosensor 134 are indicated schematically in FIG. 2, and are not shown to scale, for ease of illustration.

As noted above, the luminance of the second portion of emitted light 106 may be controlled in a spatially-varying manner or otherwise. This is shown in FIGS. 3a and 3b, which are schematic diagrams illustrating the display of an image using the display device 114 of FIG. 2.

Figure 3A:
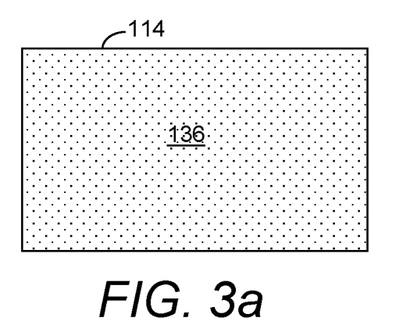
FIGS. 3a and 3b are schematic diagrams showing display of an image using the display device shown in FIG. 2.
Figure 3B:
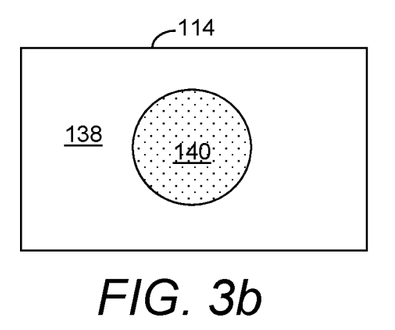

FIG. 3a illustrates an example in which a substantially spatially-uniform adjustment is applied to the luminance of the second portion of emitted light. In this example, the luminance of the image 136 is adjusted in a substantially spatially-uniform manner to adjust the luminance of the second portion of emitted light, although this is merely an example. A substantially spatially-uniform adjustment may be considered a global adjustment, e.g. with the luminance of each pixel of the image (and, hence, the second portion of emitted light) adjusted by substantially the same amount. In this context, an adjustment may be considered substantially spatially-uniform where it is spatially uniform, i.e. non-varying spatially, or where it varies to an insignificant degree, such as to a degree that would not be perceivable by an observer or a variation of less than 10%, 5%, 2% or 1% spatially. Adjustment of the luminance may be performed in this way where it is desired to achieve a particular extent of visibility of the image as a whole, e.g. if the entire image is private or otherwise sensitive.

In other cases, a spatially-variant adjustment is applied to the luminance of the second portion of emitted light. FIG. 3b illustrates such an example, in which the luminance of the second portion of emitted light is adjusted by adjusting the luminance corresponding to different respective pixels of an image to a different extent. In FIG. 3b, a luminance of a first set of pixels corresponding to a first portion 138 of an image is adjusted to a greater extent than that of a second set of pixels corresponding to a second portion 140 of the image. With this approach, the luminance can be adjusted in a flexible manner, e.g. to selectively control the visibility of a portion of the image.

The spatially-variant adjustment to the luminance of the second portion of emitted light may be based on a content of an image. For example, the luminance of the second portion of emitted light from a first portion of the image including sensitive information may be adjusted (e.g. to render or maintain this information invisible or substantially invisible to an observer at the second side of the HMD), without adjusting the luminance of the second portion of emitted light from a second portion of the image that includes public information. The image may be processed to determine its content, e.g. to identify a portion of the image comprising private information, or the content of the image may be determined in a different manner. In one case, the content of the image (e.g. whether it includes private information) is based on metadata associated with the image, which metadata indicates that the image or a portion of the image comprises private information. In another case, a display processor of the HMD 100 may have a secure channel for receiving image data including private information that is to be stored securely, and another channel for receiving other image data. In this case, it may be determined to adjust the luminance of the second portion of emitted light based on whether the image data is received via the secure channel (e.g. for which the luminance is to be adjusted) or the other channel (e.g. for which the luminance is not to be adjusted). A given image may include a first portion (e.g. a foreground) including private information, with a second portion (e.g. a background) including public or otherwise less sensitive information. In these cases, first data representative of the first portion of the image may be received via the secure channel and second data representative of the second portion of the image may be received via the other channel. The luminance of the second portion of emitted light may be adjusted as described herein for the first portion of the image, and the image displayed may be a composite of the first and second portions of the image. In a further example, the at least one processor of the HMD 100 can determine that an image contains private information based on an application the image data representing the image is received from. For example, if the image data represents an image of a user's bank account details, received from a banking application, the HMD 100 can determine that the image includes private information, and that the luminance of the second portion of emitted light should hence be adjusted as described herein.

In FIG. 3b, there is a sharp delineation between the first portion 138 and the second portion 140 of the image. In other cases, though, the luminance of the second portion of emitted light may be adjusted to avoid sudden changes in brightness between different image portions. For example, there may be at least one image portion between a first portion, for which the luminance is adjusted to a greater extent, and the second portion, for which the luminance is adjusted to a lesser extent. The luminance of the second portion of emitted light corresponding to the at least one image portion may be adjusted by an amount in between that for the first portion and for the second portion, to adjust the luminance of the second portion of emitted light more gradually.

Figure 4:
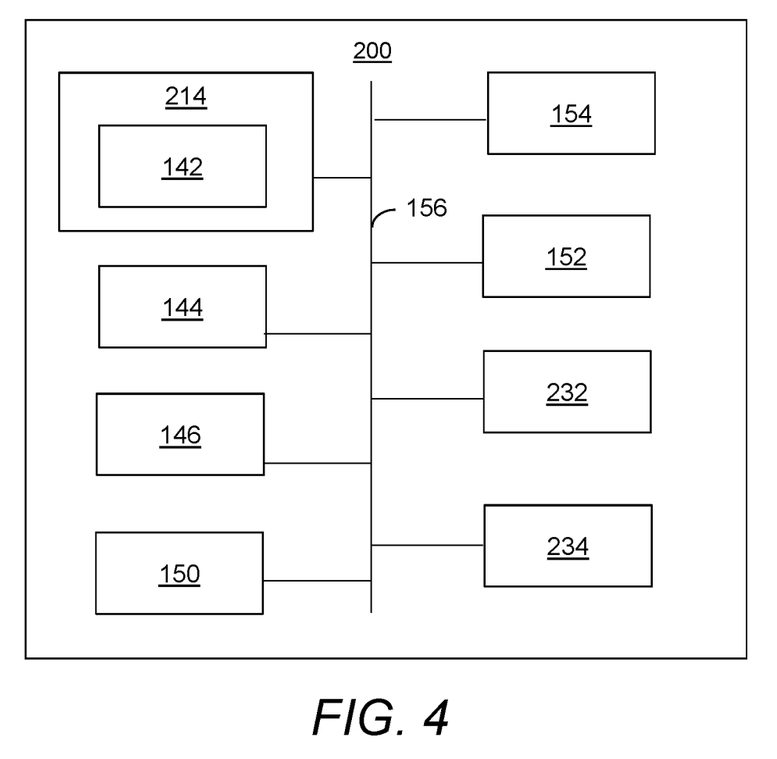
FIG. 4 is a schematic diagram showing internal components of an HMD according to examples herein.

FIG. 4 is a schematic diagram illustrating internal components of an HMD 200 according to examples herein. Features of the HMD 200 of FIG. 4 that are the same as corresponding features of the HMD 100 of FIGS. 1 and 2 are labelled with the same reference numeral but incremented by 100; corresponding descriptions are to be taken to apply.

The HMD 200 includes a display device 214, which in this case includes a backlight 142, and at least one processor 144. The at least one processor 144 is configured to control the display device 214 and may additionally be configured to perform other processing and/or controlling functions. Components of the at least one processor 144 may be communicatively coupled via at least one bus, which may have a limited bandwidth. Operations performed by the processor components may be carried out by hardware and/or software. Each of the processor components may be implemented using machine readable instructions and suitably programmed or configured hardware, such as circuitry. Each of the processor components can include a microprocessor, microcontroller, processor module or subsystem, programmable integrated circuit, programmable gate array or other computing device. The processor components may comprise multiple co-located processors or multiple disparately located processors. In some examples, the at least one processor 144 comprises computer-useable volatile and/or non-volatile memory configured to store information and/or instructions for the processor components, which may be considered to correspond to local storage of the at least one processor 144. The computer-useable volatile and/or non-volatile memory may be coupled with the bus. The computer-useable memory may comprise random access memory (RAM) and/or read-only memory (ROM).

The HMD 200 also includes storage 146 for storing various data. In FIG. 4, the storage 146 is configured to store image data representing an image to be displayed by the display device 214. The image data stored in the storage 146 may be received from a processor (such as a graphics processing unit (GPU) of the at least one processor 144 or of a further computer system) or from further storage, such as storage external to the HMD 200. The storage 146 is also configured to store luminance data indicative of a luminance of incident light incident on the second side of the HMD 200, e.g. as described with reference to FIGS. 1 and 2. The storage 146 may be a RAM such as DDR-SDRAM (double data rate synchronous dynamic random access memory). In other examples, the storage 146 may be or include a non-volatile memory such as a ROM, non-volatile memory (NVRAM) or a solid state drive (SSD) such as Flash memory. The storage 146 in examples includes further storage devices. The storage 146 may be removable or non-removable from the HMD 200. Access to the storage 146 may be controlled by a dynamic memory controller (DMC), not shown in FIG. 4.

In the example of FIG. 4, the HMD 200 includes a photosensor 232 arranged at the first side of the HMD 200, a further photosensor 234 arranged at the second side of the HMD 200 and a camera 150 arranged to capture an observation of the environment at the second side of the HMD 200. Data obtained by the photosensor 232, the further photosensor 234 and/or the camera 150 may be used to control the luminance of the second portion of emitted light, e.g. as explained with reference to FIG. 2.

The camera 150, which may be referred to as an image capture device, is operable to obtain still images or moving images (i.e. video) of the environment, and is therefore operable to capture an observation of the environment. The at least one processor 144 may be configured to obtain the luminance data indicative of the luminance of the incident light based on observation data obtained by the camera 150, representing at least one observation of the environment. The at least one processor 144 may be configured to implement computer vision (CV) functionality based on processing of the observation data obtained by the camera 150, e.g. to perform object detection and/or recognition. As explained with reference to FIG. 2, the luminance data can be obtained efficiently from the observation data, using existing components of the HMD 200. For example, other example HMDs may lack the photosensor 232, and may instead use the camera 150 to obtain the luminance data.

In the example of FIG. 4, the HMD 200 also includes a user interface 152 for receiving user data. The user interface 152 may be any suitable interface for receiving user data, such as an interface for receiving tactile input, e.g. a button, roller or switch. In other cases, the user interface may be or include an interface for receiving the user data, such as an input/output (I/O) interface, such as a universal serial bus (USB) connection, a Bluetooth or infrared connection, or a data network, for example a computer network such as the Internet, a local area network, a wide area network, a telecommunications network, a wired network, a wireless network, or some other type of network. The user data may indicate that a mode of the HMD 200 is to be switched. In this way, the user can use the user interface 152 to further control the luminance of the second portion of emitted light. For example, the user can use the user interface 152 to switch the HMD 200 into a first mode in which the luminance of the second portion of emitted light is controlled based on the luminance data. For example, in the first mode, the luminance of the second portion of emitted light may be dynamically adjusted (e.g. so that the image is invisible to an observer at the second side of the HMD 200). The user may choose to select the first mode if the user wishes to view private information using the HMD 200. The user can then switch the HMD 200 into a second mode in which the luminance of the second portion of emitted light is independent of the luminance data. For example, in the second mode, the luminance of the second portion of emitted light may not be adjusted even if the luminance of the incident light changes. The second mode may be selected if the user intends to view non-sensitive information, and for example reduces processing demands of the HMD, thereby reducing power consumption. This further improves the flexibility of the HMD 200, by allowing the user to control the display of the image themselves.

The HMD 200 includes two polarizing filters 154, one each arranged in first and second side portions as described with reference to FIG. 1. The at least one processor 144 is configured to control the polarizing filters 154 to selectively filter light incident on the first and second side portions. The polarizing filters 154 selectively filter light impinging on the polarizing filters 154 depending on the polarization state of the light. For example, if the light includes horizontally and vertically polarized light, the polarization filters 154 may filter the horizontally polarized light (e.g. by absorbing the horizontally polarized light), while allowing the vertically polarized light to be transmitted therethrough. The polarizing filters 154 are controllable to control which polarization state of light the polarizing filters 154 selectively filters and which polarization state of light the polarizing filters 154 transmits. For example, the polarizing filters 154 may be controllable to switch the polarizing filters 154 from filtering horizontally polarized light to filtering vertically polarized light, or from filtering left-handed circularly polarized light to filtering right-handed circularly polarized light. The polarizing filters 154 are each independently controllable in FIG. 4, to increase flexibility, although need not be in other examples. The polarization of the polarizing filters 154 can be controlled by a polarization modulator, e.g. an electro-optical device controllable by the at least one processor 144.

The components of the HMD 200 in the example of FIG. 4 are interconnected using a systems bus 156. This allows data to be transferred between the various components. The bus 156 may be or include any suitable interface or bus. For example, an ARM® Advanced Microcontroller Bus Architecture (AMBA®) interface, such as the Advanced eXtensible Interface (AXI), may be used.

Figure 5:
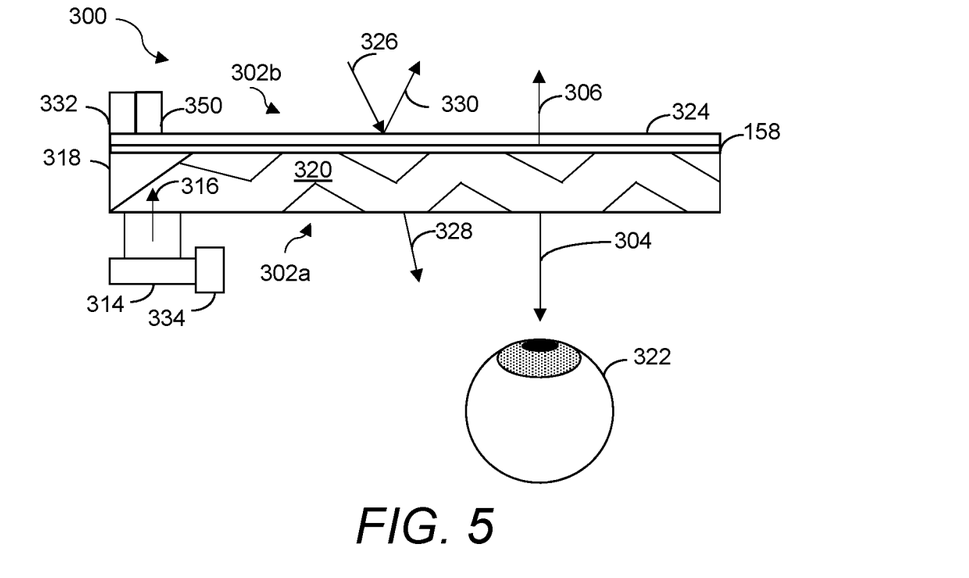
FIG. 5 is a schematic diagram showing features of an HMD according to further examples.

FIG. 5 is a schematic diagram showing features of an HMD 300 according to further examples herein. The HMD 300 of FIG. 5 is similar to the HMD 100 shown in FIGS. 1 and 2. Features of the HMD 200 of FIG. 5 that are the same as corresponding features of the HMD 100 of FIGS. 1 and 2 are labelled with the same reference numeral but incremented by 200; corresponding descriptions are to be taken to apply.

In FIG. 5, the HMD 300 includes a reflective layer 324. However, the HMD 300 also includes a layer 158 arranged to at least partially prevent transmission of light of at least one predetermined wavelength emitted by a display device 314 outward from the second side 302b of the HMD 300. The at least one predetermined wavelength for example corresponds to particular wavelengths or wavelength ranges that are emitted by pixels of the display device 314. Certain display devices, such as emissive display devices, e.g. LED-based display devices such as LED, quantum LED, OLED or micro-LED devices, tend to include pixels that emit light within a relatively narrow band of wavelengths. In other words, the spectrum of such a pixel tends to be a narrowband spectrum, rather than a wide-spectrum emission (e.g. as may be the case for a transmissive or transflective device that includes a backlight). In these cases, by at least partially preventing the light of the at least one predetermined wavelength emitted by the display device 314 from being transmitted, the layer 158 can further reduce the luminance at the second side 302b of the HMD 300. This can further reduce the visibility of the image to an observer at the second side 302b of the HMD 300, and further improve display privacy.

In the example HMD 300 of FIG. 5, the further reduction in the visibility of the image by use of the layer 158 allows a thickness of the reflective layer 324 to be reduced compared to examples (such as the HMD 100 of FIGS. 1 and 2) that lack the layer 158. By reducing the thickness of the reflective layer 324, the luminance of light 328 transmitted through the HMD 300, and incident on the user's eye 322 is increased. In other words, a greater proportion of the incident light 326 is transmitted through the HMD 300 in this example. This can allow the user to more clearly observe an outside environment, which can improve the display of the image, e.g. in AR applications in which the image is intended to be viewed as superimposed on the outside environment.

In the example of FIG. 5, a set of pixels of the display device 314 is associated with a given color channel. In such cases, each of the set of pixels may be arranged to emit light within a relatively narrow range of wavelengths corresponding to that color. The display device may be a monochrome display device, in which the pixels are each associated with the same color channel. However, in FIG. 5, the display device 314 is a color display device, with a respective plurality of pixels associated with each of a plurality of color channels. In this case, the display device 314 has three color channels (red, green and red), with first, second and third pluralities of pixels associated with each color channel, respectively. This is merely an example though.

The layer 158 is arranged to at least partially prevent transmission of wavelengths of light associated with each of the color channels the display device 314 is configured to display (i.e. red, green and blue in this example, which is to be considered non-limiting). The layer 158 need not prevent transmission of wavelengths in the entire spectrum of a particular color (e.g. the entire red spectrum). Instead, the layer 158 partially prevents transmission of a portion of the spectrum of a particular color a pixel (or a set of pixels) of the display device 314 is configured to emit. The layer 158 therefore allows other wavelengths to be transmitted. This can increase the luminance at the first side 302b of the HMD 300, e.g. in cases in which the layer 158 partially prevents transmission of the at least one predetermined wavelength for light incident on the layer 158 from the first side 302a and from the second side 302b of the HMD 300.

The layer 158 may partially prevent the transmission of the at least one predetermined wavelength in any suitable manner. In one example, the layer 158 includes a plurality of material layers, each having a different refractive index respectively. In this way, the layer 158 can be configured as a narrowband optical filter, which is configured to filter the at least one predetermined wavelength, e.g. without filtering or otherwise substantially reducing the transmission of other wavelengths outside the at least one predetermined wavelength. In other words, the layer 158 can act to partially prevent the transmission of specific wavelengths of light. Each material layer can be configured to at least partially prevent the transmission of a particular wavelength or wavelength range. In FIG. 5, the layer 158 includes at least three material layers, each with an appropriate refractive index to partially prevent the transmission of a different respective color channel, although this is merely an example and other layers may include more or fewer material layers.

In FIG. 5, the layer 158 partially prevents the transmission of the at least one predetermined wavelength by at least partially reflecting light incident on the layer 158, e.g. that is coupled to the layer 158 via the waveguide 320. In this way, the luminance of the first portion of emitted light 304 is increased relative to the luminance of the second portion of emitted light 306. This can further improve the display of the image to the user of the HMD 300, by increasing the brightness of the image. In other cases, though, the layer 158 may partially prevent the transmission of the at least one predetermined wavelength by at least partially absorbing the at least one predetermined wavelength or by partially absorbing and partially reflecting the at least one predetermined wavelength.

The layer 158 may partially prevent the transmission of the at least one predetermined wavelength for light incident on the layer 158 from the first side 302a without unduly affecting transmission of light incident on the layer 158 from the second side 302b. In other cases, though, the layer 158 may partially prevent the transmission of the at least one predetermined wavelength for light incident on either the first side 302a or the second side 302b of the layer 158. However, as explained above, in examples this does not unduly reduce the brightness at the first side 302a of the HMD 300, e.g. if the at least one predetermined wavelength corresponds to a relatively small subset of visible wavelengths.

In examples in which the layer 158 at least partially prevents the transmission of the at least one wavelength of the portion of the incident light 326 that is transmitted through the reflective layer 324, the appearance of the external environment to the user of the HMD 300 may be affected by the presence of the layer 158. This may be the case, for example, where the external environment includes ambient light with a wavelength of the at least one predetermined wavelength, e.g. if a display device of the same type as the display device 314 of the HMD 300 is deployed in the external environment. To counteract this, the HMD 300 of FIG. 5 includes a camera 350, which may be similar to or the same as the camera 150 of FIG. 4. The camera 350 is arranged to obtain observation data representative of an observation of an environment at the second side 302b of the HMD 300. At least one processor of the HMD 300 is configured to process the observation data to identify at least one feature of the environment, and to process first image data representative of a first version of the image, based on the observation data, to generate second image data representative of a second version of the image. The HMD 300 can then be controlled to display the second version of the image.

In one case, the at least one feature of the environment has a color corresponding to at least a portion of the at least one predetermined wavelength range, and the first image data is processed to generate second image data representative of a second version of the image that includes the at least one feature of the environment. For example, the observation data can be processed to identify regions of the environment that include colors that correspond to at least a portion of the at least one predetermined wavelength, which may otherwise appear dark or darker to the user of the HMD 300. The first image data can then be processed to artificially inject a color corresponding to the portion of the at least one predetermined wavelength in regions of the image that would appear to the user to correspond to the locations of the regions of the environment with colors corresponding to the at least one predetermined wavelength. In this way, the user is still able to perceive the environment, without their perception being unduly altered by the presence of the layer 158. It is to be appreciated that the at least one feature of the environment is to be considered broadly to refer to anything visible in the environment, e.g. as perceivable by a user. In other words, in these examples, a feature of the environment may be considered to correspond to a region of the environment with a color corresponding to a wavelength of the at least one predetermined wavelength.

The observation data may be processed using a suitable computer vision (CV) process, e.g. to segment the observation into regions corresponding to different colors, each of which may be considered to correspond to a respective feature of the environment. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. In other cases, gaze tracking may additionally or alternatively be used, to identify where the user of the HMD 300 is looking, and hence which features of the environment the user is focusing on, or are visible to the user. CV functionality may be performed by a CV engine of the at least one processor of the HMD 300, which is a dedicated processor for implementing CV functionality. The CV engine may be comprised by a central processing unit (CPU) or GPU of the at least one processor or may be a separate processing component. In other examples, CV functionality is performed by a processor of the at least one processor that is not dedicated to CV functionality, such as a CPU or GPU.

Figure 6:
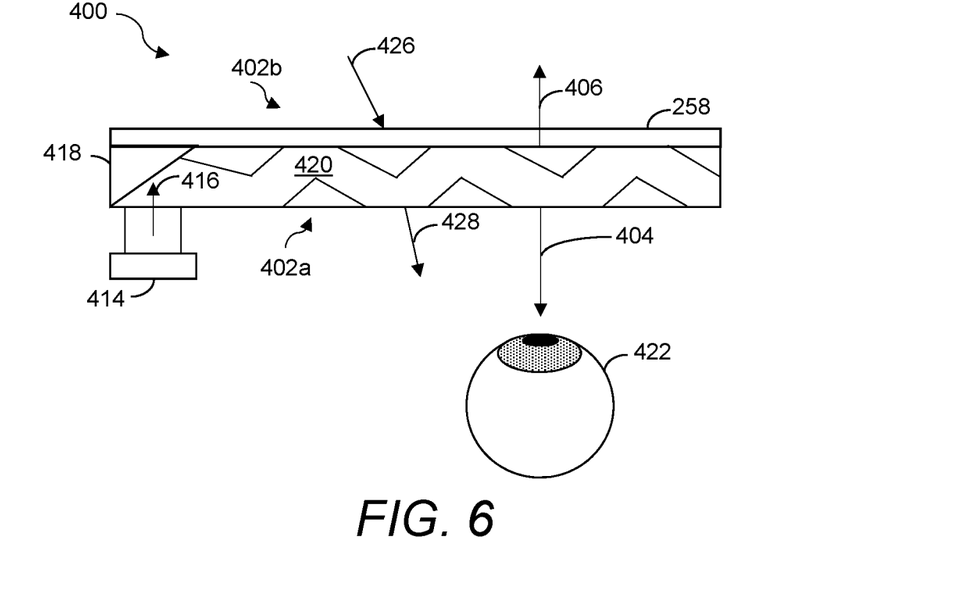
FIG. 6 is a schematic diagram showing features of an HMD according to yet further examples.

FIG. 6 is a schematic diagram showing features of an HMD 400 according to yet further examples herein. The HMD 400 of FIG. 6 is similar to the HMD 300 shown in FIG. 5. Features of the HMD 400 of FIG. 6 that are the same as corresponding features of the HMD 300 of FIG. 5 are labelled with the same reference numeral but incremented by 200; corresponding descriptions are to be taken to apply.

In FIG. 6, the HMD 400 includes the layer 258 arranged to at least partially prevent transmission of the light of the at least one predetermined wavelength emitted by the display device 414. However, the HMD 400 of FIG. 6 does not include a reflective layer, and hence does not substantially reflect incident light 426. Instead, at least part of the incident light 426 is transmitted through the HMD 400, as transmitted light 428 (e.g. corresponding to the first portion of the incident light 426 as described with reference to FIG. 2). However, due to the layer 258, the image displayed by the display device 414 is nevertheless less visible to an observer at the second side 402b than would be the case without the layer 258. Hence, it is to be appreciated that the use of the layer 258 and the use of a reflective layer (e.g. as explained with reference to FIGS. 1 and 2) may be considered alternative solutions to the same problem of achieving a particular level of privacy during display of an image by a display device 414 of an HMD 400. In FIG. 6, the HMD 400 is not shown as including a photosensor, a further photosensor or a camera. However, in other HMDs that are otherwise similar to the HMD 400 of FIG. 6, at least one of these components may be present. For example, such an HMD may include a camera to perform SLAM, e.g. to determine where content is to be displayed relative to a field of view of the user of the HMD 400, taking into account landmarks in the external environment.

Further examples are envisaged. The example HMD 100 of FIG. 1 is in the form of glasses. However, in other cases, an HMD with features otherwise similar to or the same as the HMD of examples herein may have a different structure.

For example, the HMD may be in the form of a headset, which may include suitable mounting apparatus, such as a frame and/or strap, for mounting or otherwise coupling the HMD to the user's head. An HMD in accordance with examples herein may be monocular, with a display device arranged to project an image into one eye of a user. In other cases, an HMD may be binocular, which is arranged to project an image into both eyes of a user.

First and second side portions to at least partially shield the first side of the HMD from an observer at the second side of the HMD are described in examples above in which the display device is controlled to control a luminance of the second portion of emitted light. However, it is to be appreciated that first and second side portions that are the same as or similar to those described above may be used in other HMDs in which the display device need not be controlled to control a luminance of the second portion of emitted light, e.g. an HMD similar to the HMD of FIG. 6. Furthermore, in other cases, the first and second side portions may be omitted or may have a different configuration than shown in FIG. 1. Although not shown, it is to be appreciated that HMDs similar to or the same as the HMD 300 of FIG. 5 may include first and second side portions similar to those described with reference to FIG. 1.

The HMDs 300, 400 of FIGS. 5 and 6 may include at least some internal components similar to those of the HMD 200 of FIG. 2, e.g. sufficient internal components to perform the functionality described with reference to FIGS. 5 and 6. In further examples, an HMD configured to perform the methods described herein may not include some components of the HMD 200 of FIG. 4, and/or may include additional components. For example, in FIG. 4, the display device 214 includes a backlight 142, but in other examples a display device need not include a backlight. The HMD 200 of FIG. 4 also includes polarizing filters 154, which need not be included in other HMDs for which the polarization of the first and second side portions is not controllable or is controllable in a different manner.

In FIG. 5, the reflective layer 324 is between the layer 158 and the ambient environment at the second side 302b of the HMD 300. In other examples that are otherwise similar to the HMD 300 of FIG. 5, the layer 158 may be between the reflective layer 324 and the ambient environment at the second side 302b of the HMD 300.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A head-mounted display (HMD) comprising:
    a first side for facing a user of the HMD;
    a second side opposite to the first side;
    a reflective layer for at least partially reflecting incident light incident on the second side of the HMD;
    a display device configured to emit, during display of an image by the display device, a first portion of emitted light which is directed towards the user of the HMD and a second portion of emitted light which is directed outward from the second side of the HMD; and
    at least one processor configured to:
        obtain luminance data indicative of a luminance of ambient light at the second side of the HMD; and
        control the display device, based on the luminance data, to control a luminance of the second portion of emitted light during the display of the image by the display device, such that the luminance of the ambient light at the second side of the HMD is greater than a luminance of light at the first side of the HMD.

2. The HMD of claim 1, wherein the at least one processor is configured to:
    determine, based on the luminance data, that the luminance of the ambient light has decreased; and
    control the display device to decrease the luminance of the second portion of emitted light.

3. The HMD of claim 1, wherein the at least one processor is configured to control a brightness of a backlight of the display device during the display of the image to control the luminance of the second portion of emitted light.

4. The HMD of claim 1, wherein the image is a second version of the image and the at least one processor is configured to:
    process first image data representative of a first version of the image for display by the display device to adjust luminance values associated with respective pixels of the first version of the image, based on the luminance data, thereby generating second image data representative of the second version of the image; and
    control the display device to display the second version of the image represented by the second image data.

5. The HMD of claim 1, wherein, to control the luminance of the second portion of emitted light, the at least one processor is configured to control a reflectivity of the reflective layer.

6. The HMD of claim 1, wherein, to control the luminance of the second portion of emitted light, the at least one processor is configured to apply a spatially-variant adjustment to the luminance of the second portion of emitted light.

7. The HMD of claim 6, wherein the at least one processor is configured to apply the spatially-variant adjustment to the luminance of the second portion of emitted light based on a content of the image.

8. The HMD of claim 1, comprising a camera for obtaining observation data representative of an observation of an environment at the second side of the HMD, wherein the at least one processor is configured to process the observation data to obtain the luminance data.

9. The HMD of claim 1, wherein the at least one processor is configured to:
    obtain further luminance data indicative of the luminance of light at the first side of the HMD; and
    use the further luminance data to further control the luminance of the second portion of emitted light.

10. The HMD of claim 1, wherein the HMD comprises a display portion for displaying the image to the user, the display portion disposed between a first side portion of the HMD and a second side portion of the HMD, wherein at least one of:
    the first side portion is configured for at least partly preventing transmission of light therethrough; or
    the second side portion is configured for at least partly preventing transmission of light therethrough.

11. The HMD of claim 10, wherein at least one of: the first side portion is detachable from the display portion of the HMD, or the second side portion is detachable from the display portion of the HMD.

12. The HMD of claim 1, wherein the HMD comprises a display portion for displaying the image to the user, the display portion disposed between a first side portion of the HMD and a second side portion of the HMD, wherein at least one of:
- the first side portion comprises a first polarizing filter, and the at least one processor is configured to control a polarization of the first polarizing filter to control the transmission of light therethrough; or
- the second side portion comprises a second polarizing filter, and the at least one processor is configured to control a polarization of the second polarizing filter to control the transmission of light therethrough.

13. The HMD of claim 1, comprising a user interface for receiving user data indicative that a mode of the HMD is to be switched from:
- a first mode in which the luminance of the second portion of emitted light is controlled based on the luminance data; to
- a second mode in which the luminance of the second portion of emitted light is independent of the luminance data.

14. The HMD of claim 1, wherein the display device is configured to emit light of at least one predetermined wavelength range during the display of the image by the display device, and the HMD comprises a layer arranged to at least partially prevent transmission of the light of the at least one predetermined wavelength range outward from the second side of the HMD.

15. The HMD of claim 14, comprising:
- a camera for obtaining observation data representative of an observation of an environment at the second side of the HMD; and
- at least one processor configured to:
  - process the observation data to identify at least one feature of the environment, the at least one feature of the environment having a color corresponding to at least a portion of the at least one predetermined wavelength range;
  - process first image data representative of a first version of the image to generate second image data representative of a second version of the image comprising the at least one feature of the environment; and
  - control the display device to display the second version of the image.

16. A head-mounted display (HMD) comprising:
a first side for facing a user of the HMD;
a second side opposite to the first side;
a display device configured to emit light of a first predetermined wavelength range during display of an image by the display device; and
a layer arranged to at least partially prevent transmission of the light of the first predetermined wavelength range outward from the second side of the HMD, such that a proportion of light of the first predetermined wavelength range transmitted through the layer, from the first side of the HMD to the second side of the HMD, is less than a proportion of light of a second, different predetermined wavelength range transmitted through the layer, from the second side of the HMD to the first side of the HMD, wherein the first predetermined wavelength range and the second, different predetermined wavelength range are non-overlapping.

17. The HMD of claim 16, wherein the display device comprises a first plurality of pixels associated with a first color channel and a second plurality of pixels associated with a second color channel, and the layer is arranged to at least partially prevent transmission of:
- light of a first wavelength range corresponding to the first color channel; and
- light of a second wavelength range corresponding to the second color channel.

18. The HMD of claim 16, wherein the layer comprises a plurality of material layers, each of the material layers having a different refractive index respectively.

19. The HMD of claim 16, comprising:
- a camera for obtaining observation data representative of an observation of an environment at the second side of the HMD; and
- at least one processor configured to:
  - process the observation data to identify at least one feature of the environment, the at least one feature of the environment having a color corresponding to at least a portion of the first predetermined wavelength range;
  - process first image data representative of a first version of the image to generate second image data representative of a second version of the image comprising the at least one feature of the environment; and
  - control the display device to display the second version of the image.

20. The HMD of claim 16, wherein the first predetermined wavelength range and the second, different predetermined wavelength range are each ranges of visible light.

* * * * *